(12) United States Patent
Mosher et al.

(10) Patent No.: US 12,000,526 B2
(45) Date of Patent: Jun. 4, 2024

(54) PORTABLE SCALE STAND ASSEMBLY

(71) Applicant: Scales Plus, LLC, Allendale, MI (US)

(72) Inventors: Jonathan Mosher, Allegan, MI (US); Bennett Meyer, Grandville, MI (US)

(73) Assignee: SCALES PLUS, LLC, Allendale, MI (US)

( * ) Notice: Subject to any disclaimer, the term of this patent is extended or adjusted under 35 U.S.C. 154(b) by 0 days.

(21) Appl. No.: 18/098,063

(22) Filed: Jan. 17, 2023

(65) Prior Publication Data
US 2023/0296201 A1    Sep. 21, 2023

Related U.S. Application Data

(60) Provisional application No. 63/299,624, filed on Jan. 14, 2022.

(51) Int. Cl.
| | |
|---|---|
| *F16M 11/04* | (2006.01) |
| *F16M 11/42* | (2006.01) |
| *G01G 19/00* | (2006.01) |
| *G01G 3/00* | (2006.01) |
| *G01G 21/00* | (2006.01) |

(52) U.S. Cl.
CPC .......... *F16M 11/046* (2013.01); *F16M 11/42* (2013.01); *F16M 2200/00* (2013.01); *G01G 3/00* (2013.01); *G01G 19/00* (2013.01); *G01G 21/00* (2013.01)

(58) Field of Classification Search
CPC ............... F16M 11/046; F16M 11/042; F16M 2200/00; F16M 2200/02; F16M 2200/025; F16M 2200/08; G01G 19/00; G01G 19/02; G01G 21/00; G01G 3/00
See application file for complete search history.

(56) References Cited

U.S. PATENT DOCUMENTS

| | | | | |
|---|---|---|---|---|
| 1,563,521 | A * | 12/1925 | Pearson | G01G 19/00 |
| | | | | 177/262 |
| 3,854,428 | A * | 12/1974 | Fullenkamp | A47B 9/00 |
| | | | | 248/408 |
| 4,715,573 | A * | 12/1987 | Liegel | A47B 23/046 |
| | | | | 248/129 |
| 6,240,856 | B1 * | 6/2001 | Paskey | B25H 5/00 |
| | | | | 345/643 |
| 2012/0236496 | A1 * | 9/2012 | McRorie | F16M 13/00 |
| | | | | 361/679.55 |
| 2020/0305594 | A1 * | 10/2020 | Lin | A47B 9/14 |

FOREIGN PATENT DOCUMENTS

CN          103438974 A  *  12/2013

* cited by examiner

*Primary Examiner* — Tan Le
(74) *Attorney, Agent, or Firm* — Jovan N. Jovanovic; The Watson IP Group, PLC (57) ABSTRACT

A portable scale stand assembly having a base, an articulating arm assembly and a scale platform. The base has an upper surface and a lower surface, a front edge and a rear edge opposite the front edge, and defining a base footprint. The arm assembly has a lower component, an upper component, a locking member and a biasing member. The scale platform is coupled to the upper end of the upper component. The scale platform has an opening that extends therethrough that is configured to receive a lower hook coupling of a scale. Methods of use are likewise disclosed, as are combinations of a scale and a stand assembly.

16 Claims, 8 Drawing Sheets

PORTABLE SCALE STAND ASSEMBLY

CROSS-REFERENCE TO RELATED APPLICATION

This application claims priority to U.S. Patent Application Ser. No. 63/299,624, filed Jan. 14, 2022, entitled "PORTABLE SCALE STAND ASSEMBLY", the entire specification of which is hereby incorporated by reference.

BACKGROUND OF THE DISCLOSURE

1. Field of the Disclosure

The disclosure relates in general to stands, and more particularly, to a portable scale stand assembly that is useful for, among other things, the overhead weighing of structures and items. The portable scale stand assembly is not limited to such use, and may include other uses with or without a scale which are unrelated to overhead weighing of structures and items.

2. Background Art

The use of scales is well known in the art. Amongst other types of scales, a number of scales are utilized for overhead weighing. Such weighing is when items are hung or otherwise suspended form a hook which is attached to a scale so that the weight can be determined therefrom.

Such scales are often times positionable at different heights. One issue is that in many instances it is desirable to not only adjust the height of a scale for overhead weighing, but to also be able to move the scale around within a location among a number of different positions. For example, it may be desirable to move the scale as opposed to the items to be weighed.

It is therefore desirable to have a scale stand assembly that is able to position a scale at different heights, which is suitable for overhead weighing of structures and items.

It is additionally desirable to have a scale stand assembly that can be moved around a location to facilitate the approaching and repositioning of a scale on the scale stand assembly so as to weigh structures and items at different locations.

SUMMARY OF THE DISCLOSURE

The disclosure is directed, in one aspect to a portable scale stand assembly comprises a base, an articulating arm assembly and a scale platform. The base has an upper surface and a lower surface, a front edge and a rear edge opposite the front edge. The base defines a footprint. The articulating arm assembly has a lower component, an upper component, a locking member and a biasing member. The lower component has a lower end coupled to the base and an upper end opposite the lower end. The upper component has a lower end and an upper end. The upper component is slidably coupled to the lower component wherein the upper component can slidably move between a lowered position wherein the upper end of the upper component is proximate the upper end of the lower component, to and a raised position wherein the lower end of the upper component is proximate the upper end of the lower component. The locking member is structurally configured to releasably lock the upper component relative to the lower component between the lowered position and the raised position. The biasing member is coupled at a first end to the upper component and at a second end to the lower component. The scale platform is coupled to the upper end of the upper component. The scale platform has an upper surface, a lower surface and an opening extending therethrough. The scale platform defines a scale footprint. The scale footprint overlays at least a portion of the base footprint.

In some configurations, the base further includes a plurality of wheels extending from the lower surface.

In some configurations, the lower component is coupled to the rear edge of the base. Additionally, the scale platform is coupled to the upper component at a rear edge of the scale platform.

In some configurations, the scale stand assembly includes a lower brace beam extending from the base to the upper end of the lower component of the articulating arm assembly, with the lower brace beam being oblique to the lower component.

In some configurations, the portable scale stand assembly further includes at least one cross brace between the lower brace beam and the lower component. The at least one brace is positioned between the lower end and the upper end thereof.

In some configurations, the portable scale stand assembly further includes a handle member positioned between the upper and lower end thereof.

In some configurations, the biasing member comprises at least one constant force spring having a first end coupled to the upper end of the lower component and a second end coupled to the lower end of the upper component.

In some configurations, the biasing member extends between a back surface of the upper component and the front surface of the lower component.

In some configurations, an articulation handle is positioned proximate the lower end of the upper component.

In another aspect of the disclosure, the disclosure is directed to a combination portable scale stand assembly and scale. The portable stand assembly comprises a base, an articulating arm assembly and a scale platform. The base has an upper surface and a lower surface, a front edge and a rear edge opposite the front edge. The base defines a footprint. The articulating arm assembly has a lower component, an upper component, a locking member and a biasing member. The lower component has a lower end coupled to the base and an upper end opposite the lower end. The upper component has a lower end and an upper end. The upper component is slidably coupled to the lower component wherein the upper component can slidably move between a lowered position wherein the upper end of the upper component is proximate the upper end of the lower component, to and a raised position wherein the lower end of the upper component is proximate the upper end of the lower component. The locking member is structurally configured to releasably lock the upper component relative to the lower component between the lowered position and the raised position. The biasing member is coupled at a first end to the upper component and at a second end to the lower component. The scale platform is coupled to the upper end of the upper component. The scale platform has an upper surface, a lower surface and an opening extending therethrough. The scale platform defines a scale footprint. The scale footprint overlays at least a portion of the base footprint. The scale includes a lower hook coupling. The scale is positioned on the upper surface of the scale platform, so that the lower hook coupling extends through the opening of the scale platform.

In some configurations, the lower hook coupling overlies the base footprint.

In some configurations, at least a portion of the scale overlies the base footprint.

In some configurations, the entirety of the scale overlies the base footprint.

In some configurations, the entirety of the scale is within the scale footprint.

In yet another aspect of the disclosure, the disclosure is directed to a method of using a portable scale stand assembly comprising the steps of: providing a scale stand assembly; placing a scale on the scale platform, the scale having a lower hook coupling; positioning the scale on the scale platform so that the lower hook coupling is accessible through the opening on the scale platform; adjusting an articulating arm of the scale stand assembly to one of raise and lower the scale platform; and weighing an item with a scale on the scale stand assembly by associating the item with the lower hook coupling.

In some configurations, the step of adjusting further comprises the steps of unlocking the articulating arm so as to allow for relative movement of the upper component and the lower component; slidably moving the upper component relative to the lower component; and locking the articulating arm to preclude relative movement of the upper component and the lower component.

In some configurations, the base further includes wheels extending from the lower surface thereof. In some such configurations, the method further comprises the step of moving the portable scale stand assembly through the wheels.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
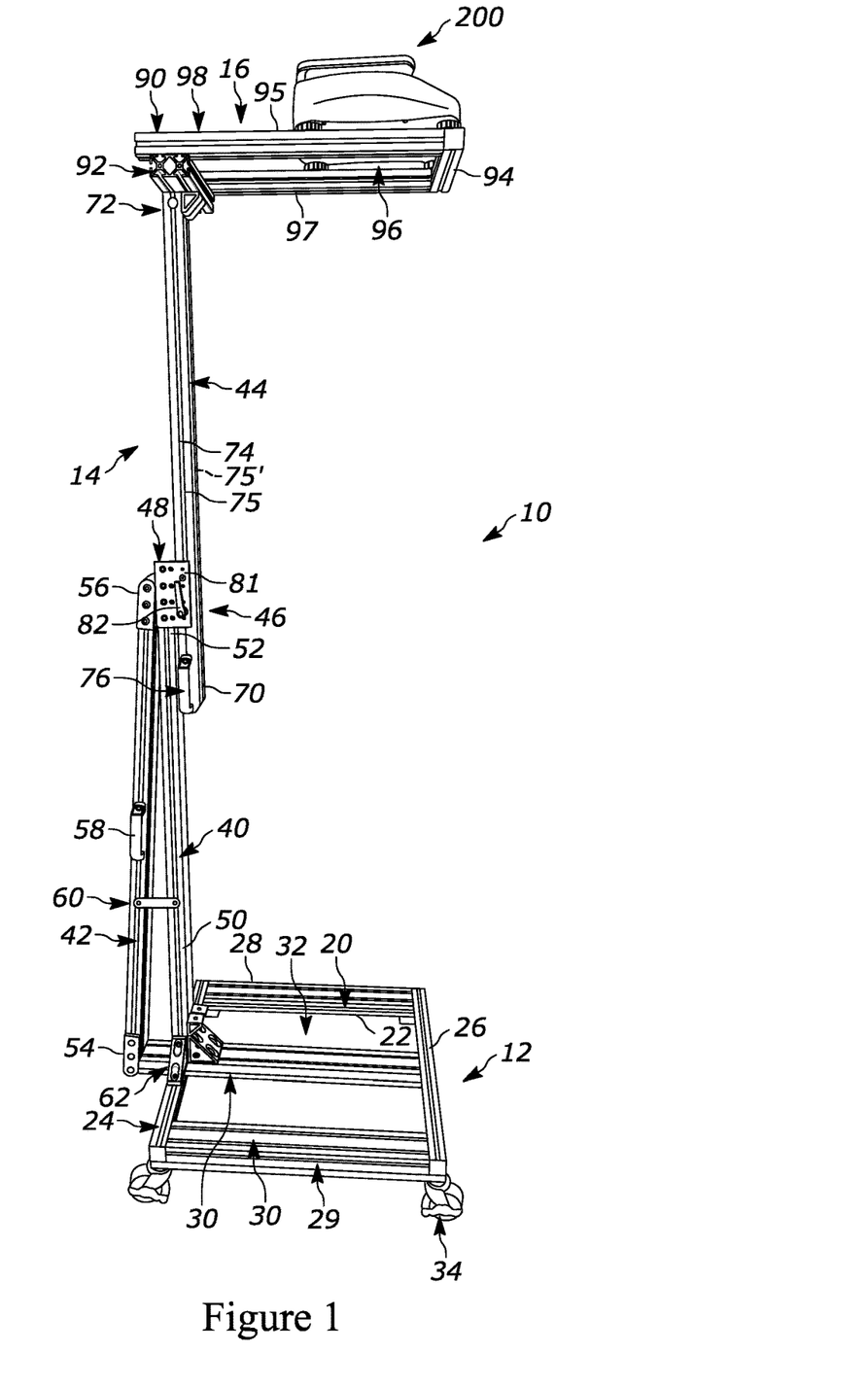
FIG. 1 of the drawings is a side, top perspective view of the portable scale stand assembly of the present disclosure showing a scale positioned on the scale platform thereof, and showing the articulating arm assembly in an extended configuration.

Referring now to the drawings and in particular to FIG. 1, the portable scale stand assembly is shown generally at 10. The portable scale stand assembly is suited to the overhead weighing of structures and items. The portable scale stand assembly is not limited to such use and may have other uses some of which may be associated with a scale or scales and weighing devices. Additionally, the portable scale assembly is not limited for use in association with any particular type, category or class of scale, or any particular size or capacity of scale. Indeed, the components can be varied both in size and shape so as to accommodate various types of scales having various configurations and capacities.

Figure 2:
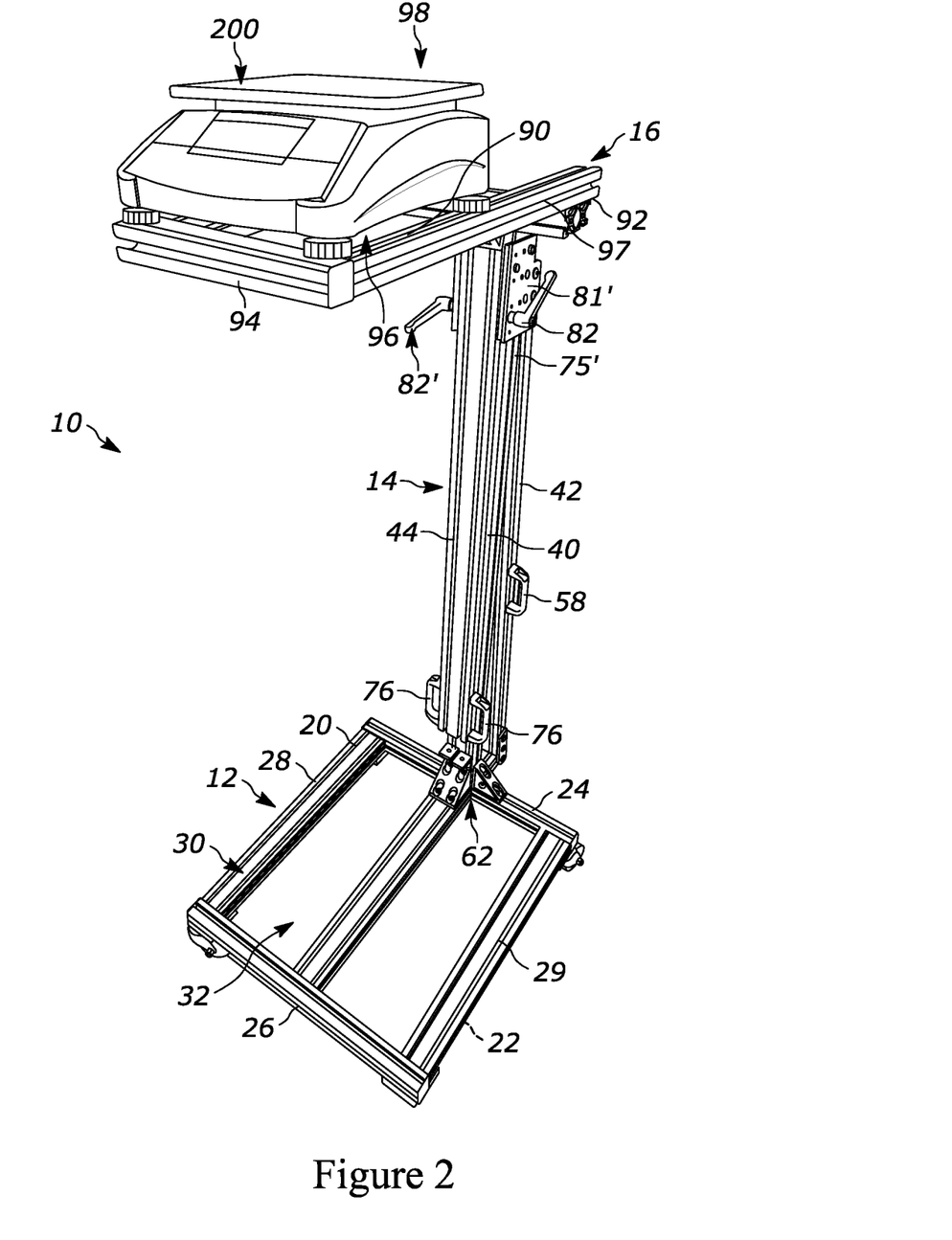
FIG. 2 of the drawings is a front, side, top perspective view of the portable scale stand assembly of the present disclosure, showing a scale positioned on the scale platform thereof, and showing the articulating arm assembly in a collapsed configuration.
Figure 3:
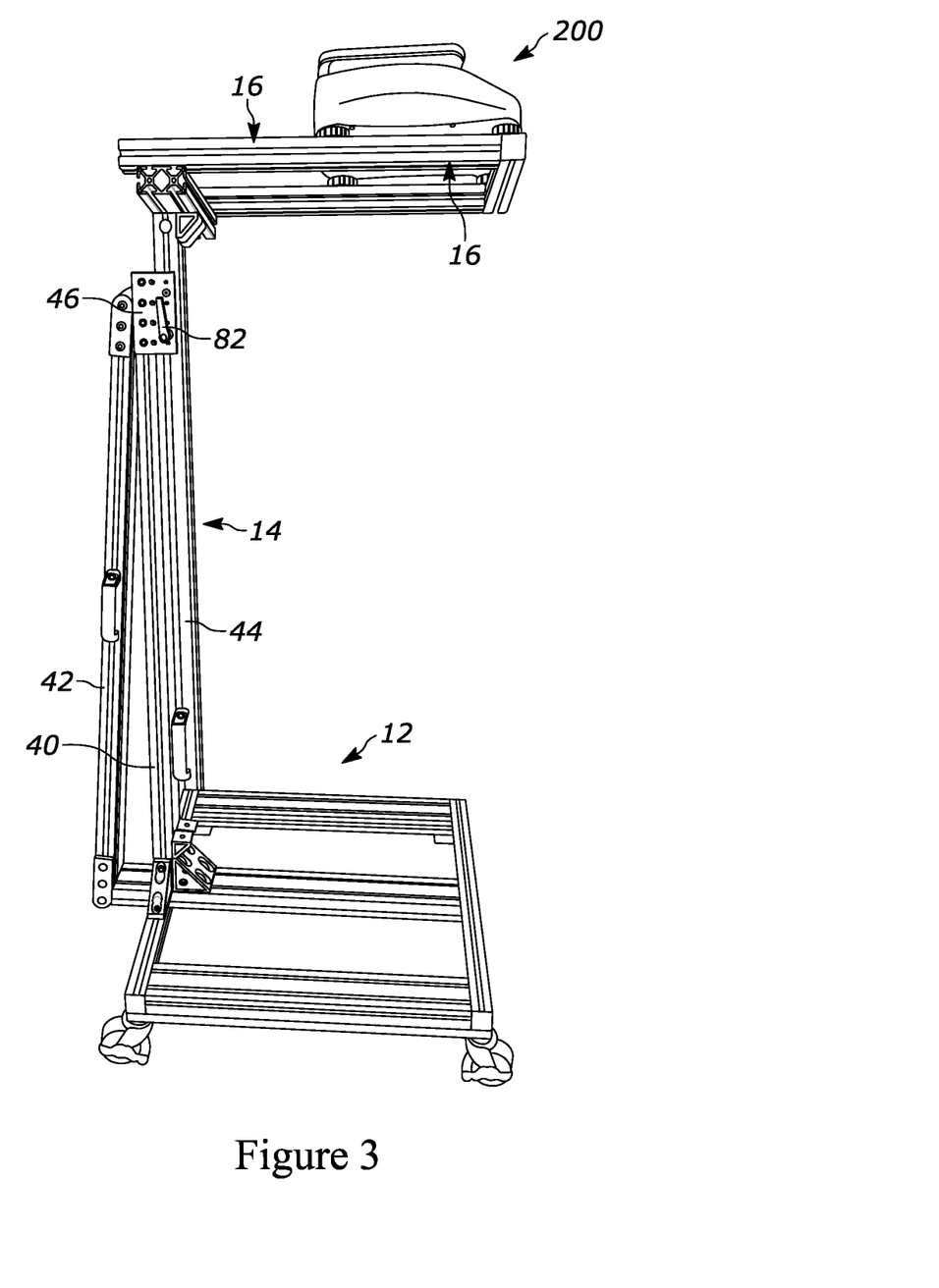
FIG. 3 of the drawings is a front, side, top perspective view of the portable scale stand assembly of the present disclosure, showing a scale positioned on the scale platform thereof, and showing the articulating arm assembly in a collapsed configuration.

The portable scale stand assembly 10 is shown in FIGS. 1 through 3 as comprising base 12, articulating arm assembly 14 and scale platform 16. The portable scale stand assembly 10, in the configuration shown is shown as being used in association with scale 200 which includes a lower access hook (not shown) to which structures may be coupled for purposes of overhead weighing of the same.

The base 12 is shown as defining upper surface 20, lower surface 22, rear edge 24, front edge 26 and first and second side edges 28, 29. These edges are formed by a plurality of beams 30 the central one of which extends beyond the rear edge 24. Additionally, the base 12 defines a footprint 32 which is the area generally bounded by the perimeter of the base 12. In the configuration shown, the base comprises a plurality of beam members that are fastened together with fasteners. Such beam members may be welded or otherwise adhered or joined. Additionally, structures other than beams (i.e., plates, surfaces or combinations thereof) may be utilized to form the base. Further, weights or other structures may be coupled to the base to promote stability in certain configurations, as desired.

To facilitate movement of the portable scale stand assembly 10, the lower surface 22 may have wheels 34 extending therefrom to facilitate wheeled movement of the assembly along the ground or other outside surface. In the configuration, four wheels that are rotatable coupled to the frame so as to be able to pivot about a vertical axis, and that are lockable, are positioned about the perimeter of the base, so as to maximize stability. Of course, in other configurations, fewer wheels may be utilized that have limited or multiple degrees of movement. In other configurations, wheels may be replaced with slide elements that facilitate slidable movement along a surface. In other configurations, a separate wheeled structure or frame may be coupled to the base to facilitate movement. In still other configurations, the assembly may be configured to releasably couple the base to a fixed structure (or to another movable structure).

The articulating arm assembly 14 is shown as extending from the base 12, and includes lower component 40, lower brace beam 42, upper component 44, slidable coupling member 46 and biasing member 48. In general, the articulating arm assembly 14 is configured to position the scale at various vertical positions spaced apart from the base 12, wherein the articulating arm can be locked into a plurality of different overall lengths releasably. It will be understood that in some configurations, the articulating arm may be fixed in a single length, or a set of predetermined lengths (i.e., indexing, or made from a single fixed length).

The lower component 40 generally extends vertically from the rear edge of the base 12 and includes lower end 50 and upper end 52. The lower brace beam 42 includes lower end 54 and upper end 56. The lower brace beam meets and is coupled to the lower component 40 proximate the upper ends 52, 56 of the lower brace beam and the lower component. At the lower end of the two beams, the lower component and the lower brace beam are spaced apart, such that the lower brace beam is oblique to the lower component 40. In the configuration shown, the lower end of the lower brace beam is coupled to an extension of the central beam beyond the rear edge of the base. A handle member 54 may be coupled to the lower brace beam (or to the lower component) between the lower and upper end thereof so as to facilitate the repositioning of the portable scale stand assembly (and on one or both sides of the lower brace beam).

Figure 6:
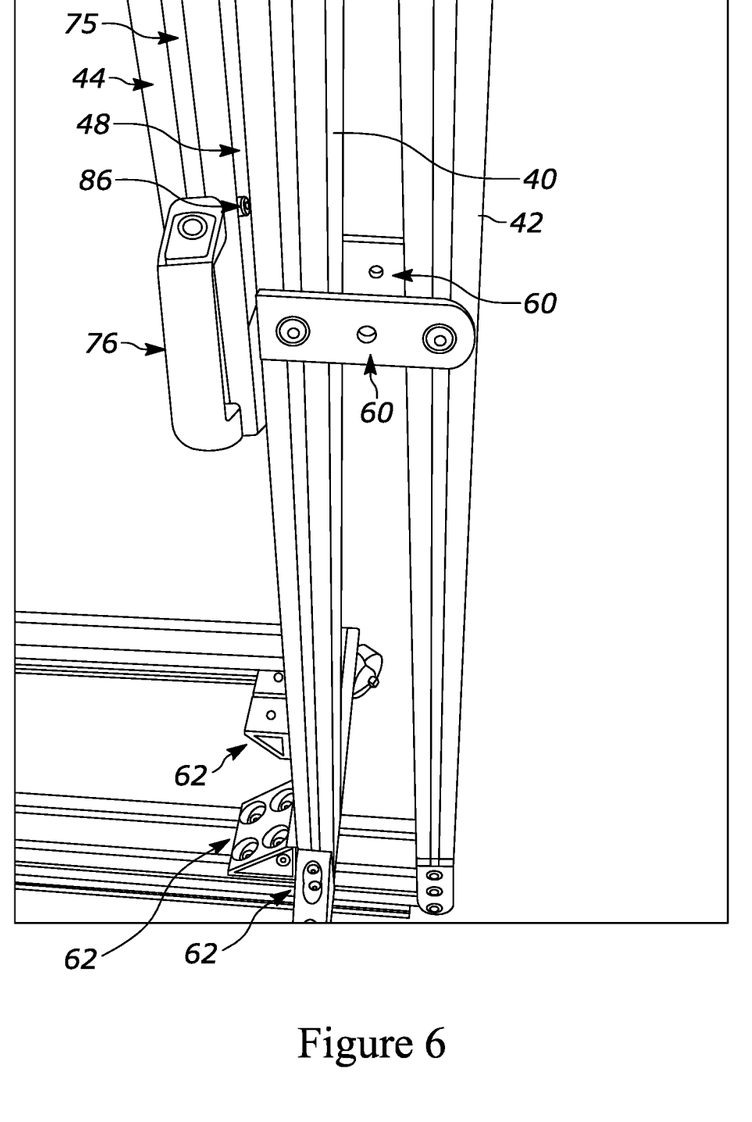
FIG. 6 of the drawings is a partial side elevational view of the portable scale assembly of the present disclosure, showing, in particular, the cross brace between the lower component and the lower brace beam.
Figure 7:
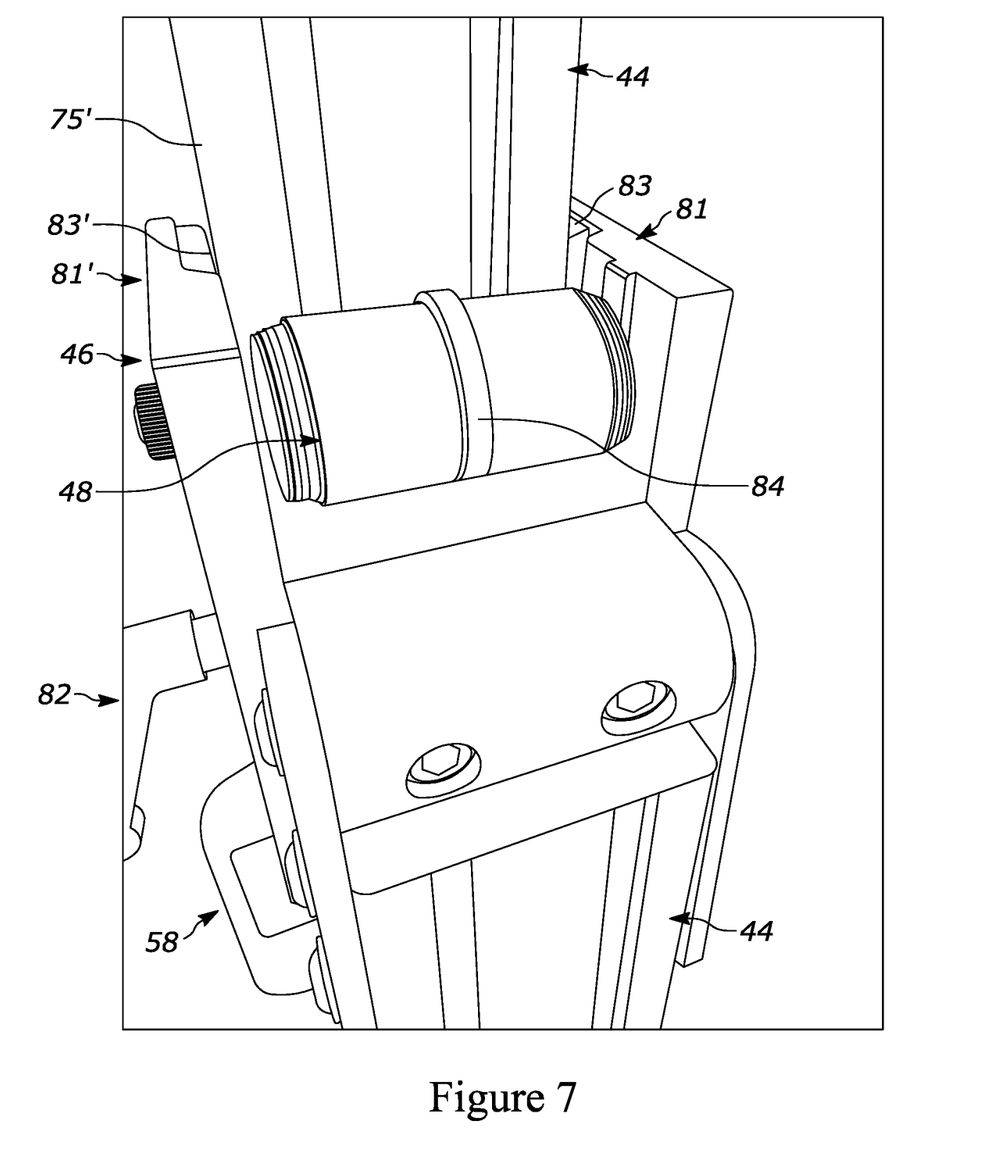
FIG. 7 of the drawings is a partial perspective view of the portable scale assembly of the present disclosure, showing, in particular, the biasing member and the slidable coupling member and the interaction thereof with the upper component.

In some configurations, as is shown in FIG. 1 and FIG. 6, an additional pair of cross braces 60 may be positioned between the lower component and the lower brace beam between the lower end and the upper end thereof. In the configuration shown, the cross braces 60 are generally perpendicular to the lower component, while other configurations are contemplated.

Figure 8:
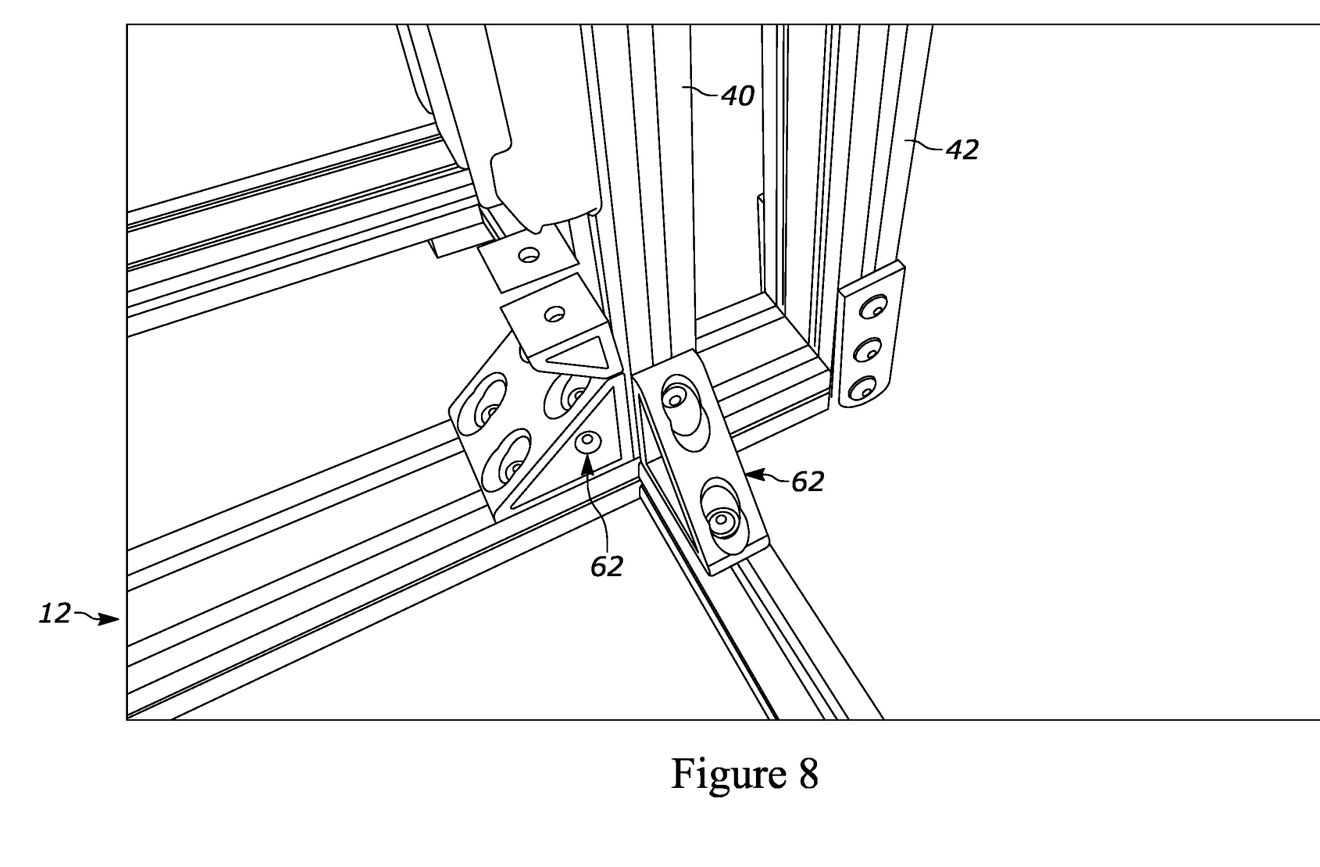
FIG. 8 of the drawings is a partial perspective view of the portable scale assembly of the present disclosure, showing, in particular, the base with the lower component and the lower buttress supports therebetween to enhance rigidity.

Additionally, and with further reference to FIGS. 1, 6 and 8, lower buttresses and supports 62 may be utilized to enhance the structural rigidity between the bae and the lower component and/or the lower brace beam so as to further limit any bowing or other elastic deformation of the lower brace beam or the lower component.

Figure 4:
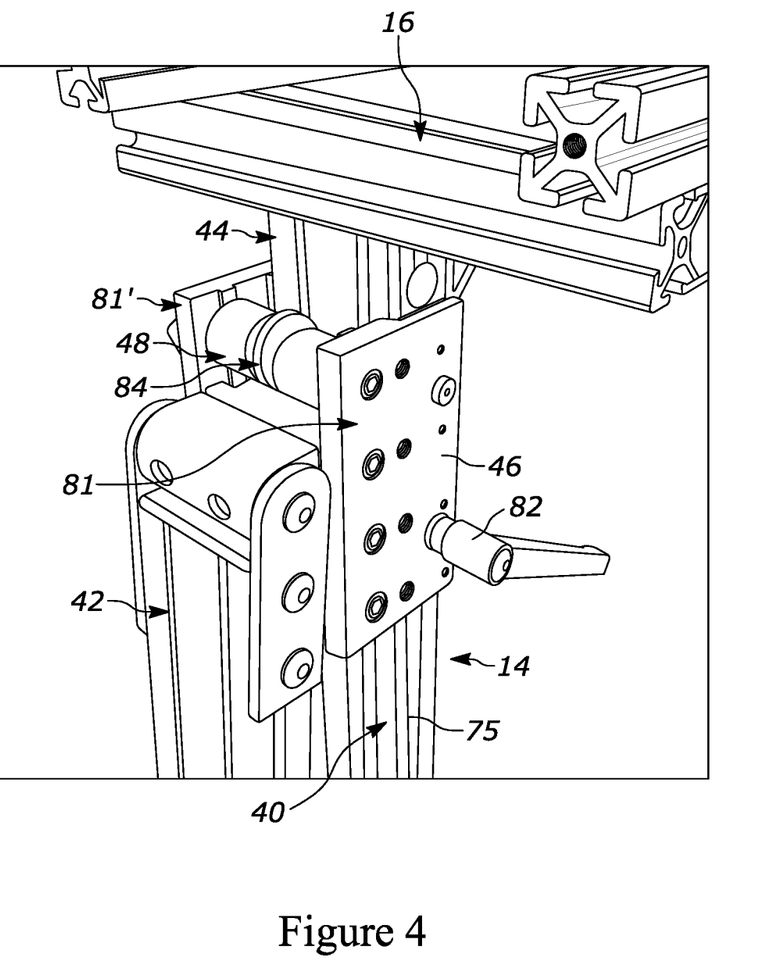
FIG. 4 of the drawings is a partial perspective view of the portable scale stand assembly of the present disclosure, showing, in particular, the biasing member, and showing the articulating arm in the collapsed configuration.
Figure 5:
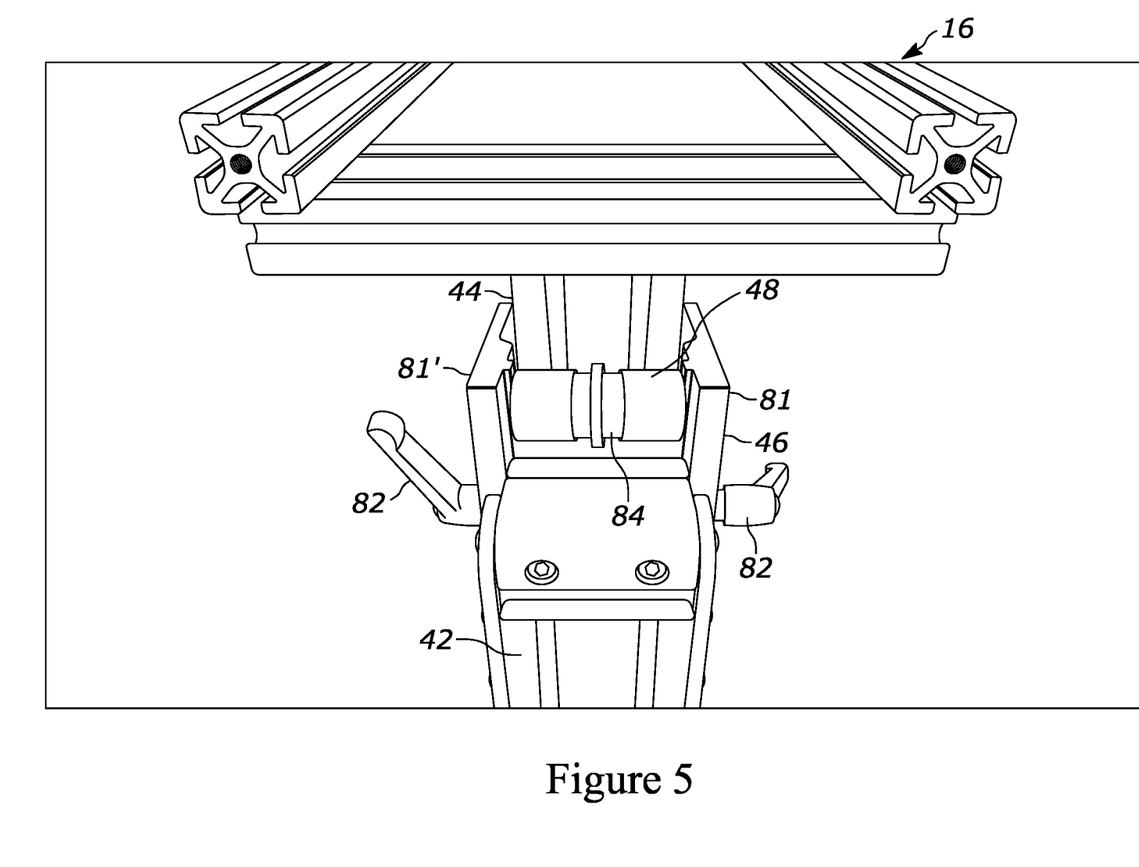
FIG. 5 of the drawings is a partial perspective view of the portable scale stand assembly of the present disclosure, showing, in particular, the biasing member, and showing the articulating arm in the collapsed configuration.

The upper component 44 is shown in FIG. 44 as comprising lower end 70, upper end 72, coupling interface 74 and articulation handle 76. The coupling interface comprises opposing channels 75, 75' on opposing sides of the upper component. The articulation handle may be positioned on both of the sides near the lower end of the upper component so as to be easily reachable in a fully extended or fully extracted configuration.

With reference to FIGS. 1, 4, 5 and 7, the slidable coupling member 46 is fixedly coupled to the upper end of the lower component 40 and/or the upper end of the lower brace beam. The slidable coupling member 46 includes lower component mating coupling 80 and locking member 82. In the configuration shown, the slidable coupling member includes opposing walls 81, 81' which, together with the lower component form a u-shaped channel (which channel is configured to accept the upper component, slidably therewithin). The mating coupling 80 in the configuration shown comprises a pair of opposing tabs 83, 83' that extend from the opposing walls 81, 81' a portion of which extends into the opposing channels 75, 75'. The configuration allows for the slidable movement in opposing directions, while precluding the removal of the upper component from within the u-shaped channel formed by the opposing walls 81, 81'. In the configuration shown, the opposing tabs 83, 83' may comprise polymer members that are positioned between the opposing walls.

It will be understood that while a u-shaped channel is shown, it is also contemplated that a telescopic configuration may be utilized between the lower component and the upper component (wherein the upper component, for example, may telescope from the lower component). In such a configuration, the upper component and the lower component may have similar cross-sectional configurations (with the upper component fitting within the lower component, for example), wherein such cross-sectional configurations may be square, rectangular, circular, oval, elliptical, or otherwise.

The locking members 82 positioned on opposing sides, each comprise a handle with a threaded member that extends through the respective wall 81, 81' so as to be contactable with the respective opposing tab 83, 83' and/or the upper component. It will be understood that rotation of the handle of the locking member in one direction (i.e., clockwise or counter-clockwise) pushes the end of the threaded member into sandwiching engagement with one of the opposing tab 83, 83' and the upper component to preclude slidable movement of the upper component 40 and the lower component 44 relative to each other, effectively locking the articulating arm at a desired length (i.e., height). In some configurations a single locking member may be utilized, or a pair of locking members may be utilized (where one or both are to be locked to preclude relative movement).

With further reference to FIGS. 1 and 4 through 7, the biasing member 48 comprises a pair of constant force springs that are positioned in a side by side configuration. The first end 84 end of each of the constant force springs is coupled to one of the lower component and the slidable coupling member, and the second end 86 (FIG. 6) of each of the constant force springs is attached to the upper component toward, near or at the lower end thereof. In such a configuration, the constant force spring aids the user to both raise and to lower the upper component relative to the lower component, both to raise the device and to lower the device. Additionally, if the locking member is not fully engaged, then the biasing member precludes the sudden relative movement of the upper component and the lower component. Of course, other biasing members or frictional members that frictionally limit or through a biasing force relative movement (or aid in relative movement) are contemplated.

The scale platform 16 is shown in FIGS. 1 through 3 as comprising upper surface 90, rear edge 92, front edge 94 and opposing side edges 95, 97. The scale platform defines a scale platform 98 onto which a scale may be positioned. An opening 96 is defined in the scale platform so as to provide access to the lower hook coupling of the scale 200 positioned on the upper surface 90. In the configuration shown, the scale platform is formed from a plurality of beams into a generally rectangular configuration coupled through fasteners. In other configurations, plates or beams which may be fastened or welded are contemplated for use.

The scale platform 16 is coupled to the upper end of the upper component (i.e., toward, at or near the upper end) proximate the rear edge 24. In such a configuration, the scale footprint 98 generally overlies the footprint 32 formed by the base, in which configuration, additional stability can be achieved. In the configuration shown, the scale footprint generally fits completely within the footprint 32, whereas in other configuration, the footprint 32 may be larger, the same size or smaller than the scale footprint, and, the two structures may be in a directly overlying configuration, or may be in an offset configuration. A plurality of upper buttress supports 99 may be positioned between the upper end of the upper component and the scale platform so as to enhance the rigidity of the same.

The scale 200, in the configuration shown, is positioned on the upper surface 90 of the platform toward the front edge thereof. Access is provided to the lower end of the scale 200 through the opening 96.

In operation, it will be understood that generally, the articulating arm assembly is configured so as to have the scale platform positionable between a collapsed configuration, wherein the upper end of the upper component (or the scale platform itself) is positioned proximate the upper end of the lower component and the slidable coupling member, and, a fully extended configuration, wherein the lower end of the upper component is slidably positioned proximate the upper end of the lower component and/or the slidable coupling member.

It will be understood that the articulating arm assembly is likewise positionable into other configurations, comprising a partially extended configuration, wherein the slidable coupling member (and/or the upper end of the lower component) are located between the upper end and the lower end of the upper component.

The user can simply raise and lower the upper component, using, for example, one or both of the articulation handles 76 (while holding, retaining or limiting movement of the entire assembly). Once the desired height is reached, the user can rotate the locking member so as to lock the upper component in the set, desired position. It will be understood that a number of different locking structures are contemplated for use.

To assist a user with the adjustment of the length of the articulating arm assembly, the biasing member can supply some of the force necessary to move the two components, and can also provide a force to preclude such movement (or to limit the speed of such movement).

Once the user has raised or lowered the upper component to the desired height, the user can then couple structures to the lower coupling of the scale to weigh the same. Once all desired items have been weighed, the user can lower the upper component for storage of the assembly.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A portable scale stand assembly comprising:
   a base having an upper surface and a lower surface, a front edge and a rear edge opposite the front edge, the base defining a base footprint;
   an articulating arm assembly comprising:
      a lower component having a lower end coupled to the base and an upper end opposite the lower end;
      an upper component having a lower end and an upper end, the upper component being slidably coupled to the lower component wherein the upper component can slidably move between a lowered position wherein the upper end of the upper component is proximate the upper end of the lower component, to and a raised position wherein the lower end of the upper component is proximate the upper end of the lower component;
      a locking member structurally configured to releasably lock the upper component relative to the lower component between the lowered position and the raised position; and
      a biasing member coupled at a first end to the upper component and at a second end to the lower component;
   a scale platform coupled to the upper end of the upper component, the scale platform having an upper surface and a lower surface, and defining a scale footprint, the scale footprint overlying at least a portion of the base footprint; and
   a lower brace beam extending from the base to the upper end of the lower component of the articulating arm assembly, with the lower brace beam being oblique to the lower component.

2. The portable scale stand assembly of claim 1 wherein the base further includes a plurality of wheels extending from the lower surface.

3. The portable scale stand assembly of claim 1 wherein the lower component is coupled to the rear edge of the base, and, the scale platform is coupled to the upper component at a rear edge of the scale platform.

4. The portable scale stand assembly of claim 1 further including at least one cross brace between the lower brace beam and the lower component, between the lower end and the upper end thereof.

5. The portable scale stand assembly of claim 1 further comprising a handle member positioned between the upper and lower end thereof.

6. A portable scale stand assembly comprising:
   a base having an upper surface and a lower surface, a front edge and a rear edge opposite the front edge, the base defining a base footprint;
   an articulating arm assembly comprising:
      a lower component having a lower end coupled to the base and an upper end opposite the lower end;
      an upper component having a lower end and an upper end, the upper component being slidably coupled to the lower component wherein the upper component can slidably move between a lowered position wherein the upper end of the upper component is proximate the upper end of the lower component, to and a raised position wherein the lower end of the upper component is proximate the upper end of the lower component;
      a locking member structurally configured to releasably lock the upper component relative to the lower component between the lowered position and the raised position; and
      a biasing member coupled at a first end to the upper component and at a second end to the lower component; and
   a scale platform coupled to the upper end of the upper component, the scale platform having an upper surface and a lower surface, and defining a scale footprint, the scale footprint overlying at least a portion of the base footprint,
   wherein the biasing member comprises at least one constant force spring having a first end rotatably coupled to the upper end of the lower component and a second end in fixed attachment to the lower end of the upper component, such that relative movement of the upper component and the lower component one of uncoils and recoils the at least constant force spring.

7. The portable scale assembly of claim 6 wherein the biasing member extends between a back surface of the upper component and the front surface of the lower component.

8. The portable scale assembly of claim 1 wherein an articulation handle is positioned proximate the lower end of the upper component.

9. A combination portable scale stand assembly and scale, wherein:
  the portable scale stand assembly comprises:
    a base having an upper surface and a lower surface, a front edge and a rear edge opposite the front edge, the base defining a base footprint;
    an articulating arm assembly comprising:
      a lower component having a lower end coupled to the base and an upper end opposite the lower end;
      an upper component having a lower end and an upper end, the upper component being slidably coupled to the lower component wherein the upper component can slidably move between a lowered position wherein the upper end of the upper component is proximate the upper end of the lower component, to and a raised position wherein the lower end of the upper component is proximate the upper end of the lower component;
      a locking member structurally configured to releasably lock the upper component relative to the lower component between the lowered position and the raised position; and
      a biasing member coupled at a first end to the upper component and at a second end to the lower component; and
    a scale platform coupled to the upper end of the upper component, the scale platform having an upper surface, a lower surface and an opening extending therethrough, and defining a scale footprint, the scale footprint overlying at least a portion of the base footprint; and
  the scale includes a lower hook coupling, the scale positioned on the upper surface of the scale platform, so that the lower hook coupling extends through the opening of the scale platform.

10. The combination of claim 9 wherein the lower hook coupling overlies the base footprint.

11. The combination of claim 9 wherein at least a portion of the scale overlies the base footprint.

12. The combination of claim 9 wherein the entirety of the scale overlies the base footprint.

13. The combination of claim 12 wherein the entirety of the scale is within the scale footprint.

14. A method of using a portable scale stand assembly comprising the steps of:
  providing a scale stand assembly of claim 1;
  placing a scale on the scale platform, the scale having a lower hook coupling;
  positioning the scale on the scale platform so that the lower hook coupling is accessible through the opening on the scale platform;
  adjusting an articulating arm of the scale stand assembly to one of raise and lower the scale platform; and
  weighing an item with a scale on the scale stand assembly by associating the item with the lower hook coupling.

15. The method of claim 14 wherein the step of adjusting further comprises the steps of:
  unlocking the articulating arm so as to allow for relative movement of the upper component and the lower component;
  slidably moving the upper component relative to the lower component; and
  locking the articulating arm to preclude relative movement of the upper component and the lower component.

16. The method of claim 15 wherein the base further includes wheels extending from the lower surface thereof, the method further comprising the step of: moving the portable scale stand assembly through the wheels.

* * * * *